UNITED STATES PATENT OFFICE.

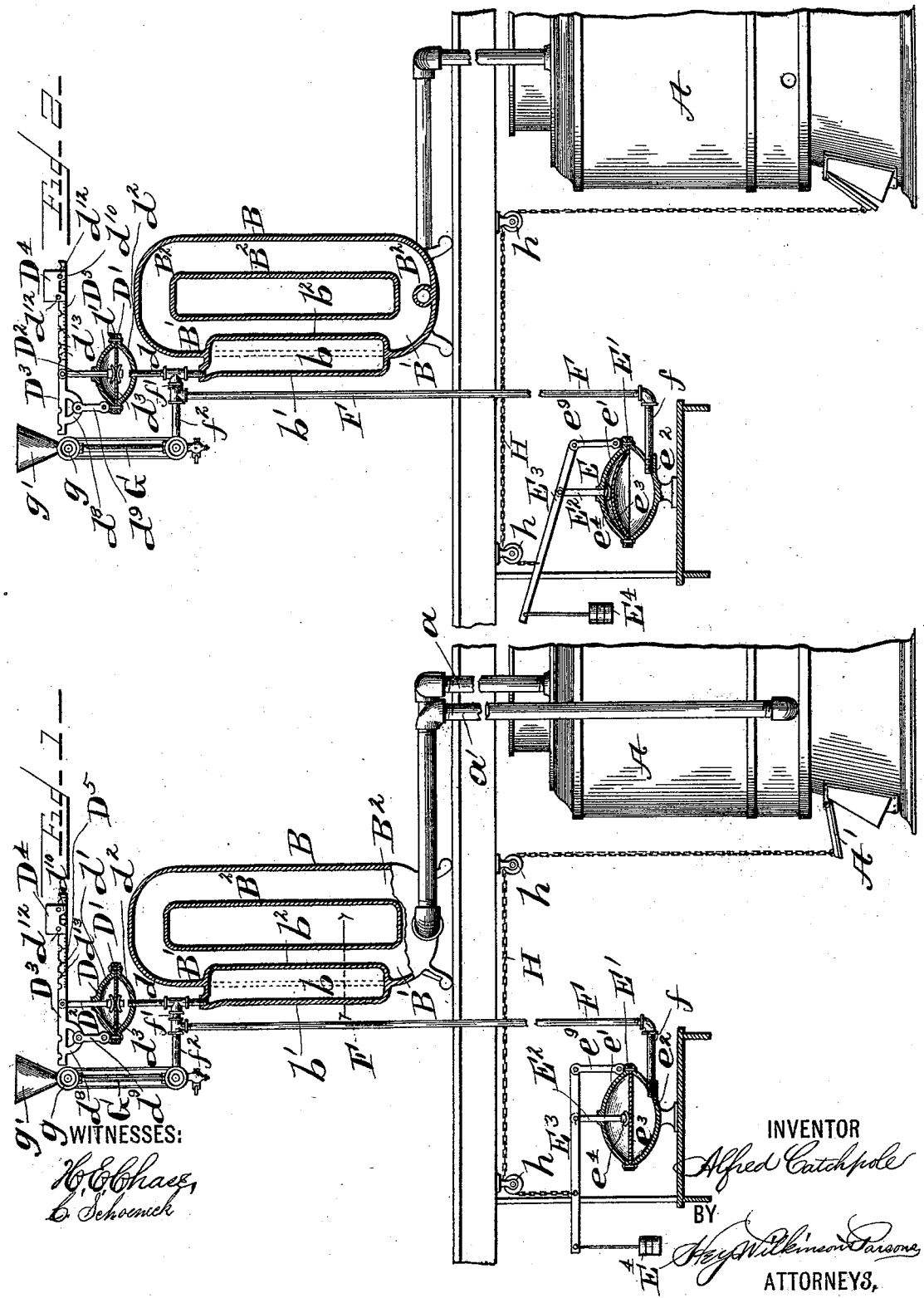

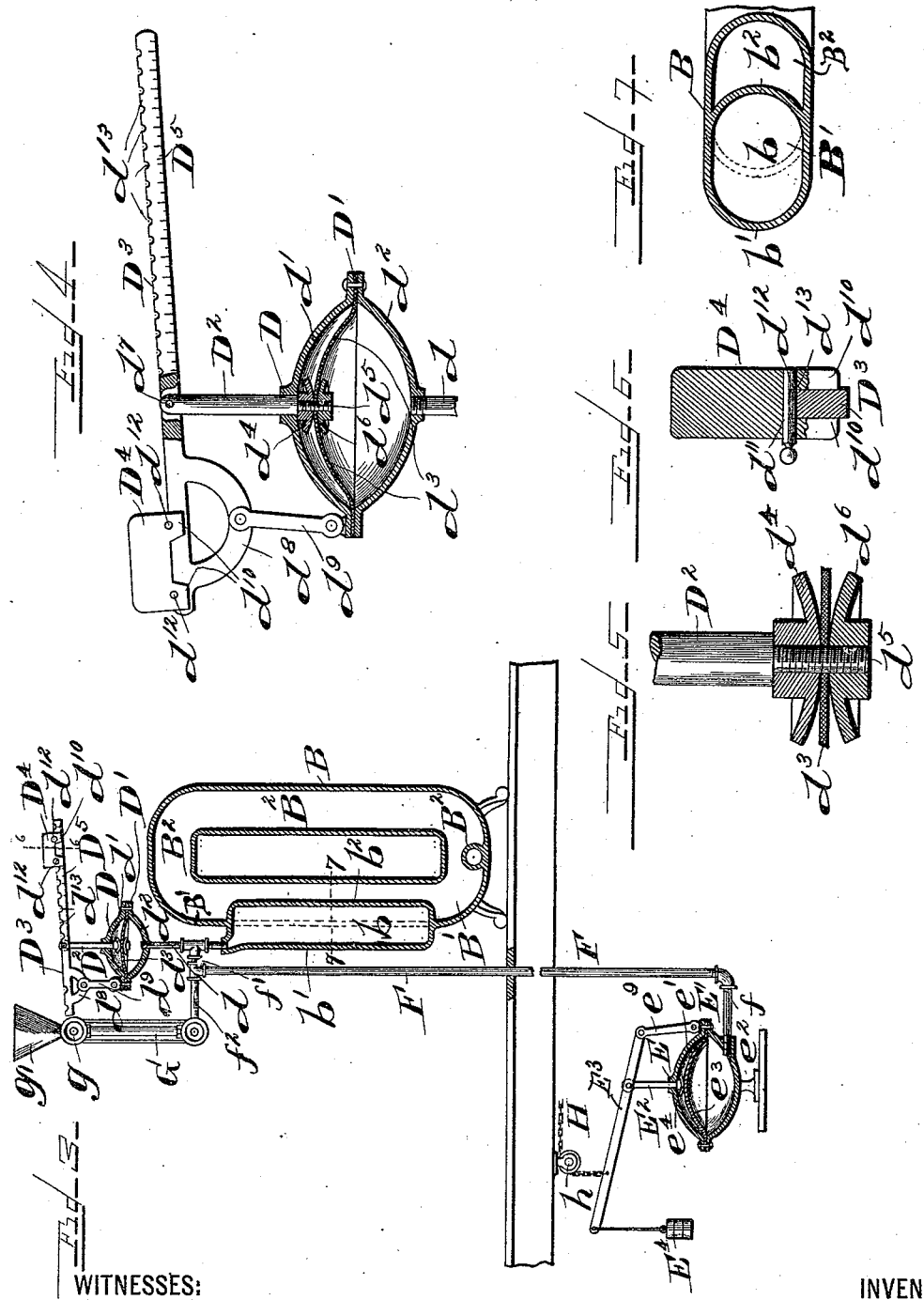

ALFRED CATCHPOLE, OF GENEVA, NEW YORK.

DAMPER-REGULATOR.

SPECIFICATION forming part of Letters Patent No. 510,060, dated December 5, 1893.

Application filed May 20, 1892. Serial No. 433,677. (No model.)

*To all whom it may concern:*

Be it known that I, ALFRED CATCHPOLE, of Geneva, in the county of Ontario, in the State of New York, have invented new and useful Improvements in Damper-Regulators, of which the following, taken in connection with the accompanying drawings, is a full, clear, and exact description.

My invention relates to improvements in regulators for governing the action of generators of various kinds, and particularly the class used for heating a circulating fluid as steam or water, and has for its object the production of a simple and effective device so constructed and arranged as to be automatically, positively, and practically brought into action by the expansion and contraction of a body of water or other liquid; and to this end it consists, essentially, in a chamber, as a radiator, for a circulating fluid, a water-containing or "expansion" chamber in proximity to the radiator, a first or "safety" pressure regulator provided with a water containing chamber of small size, a pipe between the latter chamber and the expansion chamber, a second or "governing" pressure regulator provided with a water-containing chamber of larger size, a pipe between the former pipe and the water-containing chamber of the governing pressure regulator, a movable connection having one end secured to the governing pressure regulator and the other adapted to be secured to the draft door of a generator; and in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 represents an elevation, partly in section, of my improved expansion chamber connected to a hot water radiator and to a detached portion of a hot water generator, the rocking levers of the upper and lower pressure regulators being shown in their normal position, and the draft door of the generator as considerably open. Fig. 2 is a similar view to Fig. 1, the weighted end of the rocking lever of the governing pressure regulator being shown as elevated and the draft door of the generator as almost entirely closed. Fig. 3 is a similar view to Fig. 2, with the exception that the generator and its pipes are omitted, the weighted end of the rocking lever of the governing pressure regulator as in its extreme elevated position, and the corresponding end of the rocking lever of the safety pressure regulator as slightly elevated above its normal position as shown at Figs. 1 and 2. Fig. 4 is a longitudinal sectional view of the safety regulator, the weight being shown upon the short arm of the rocking lever in its position assumed when desired to quickly drop the draft door. Fig. 5 is an enlarged sectional view of the diaphragm of the safety pressure regulator and the plunger connected thereto. Fig. 6 is a vertical sectional view, taken on line —6—6—, Fig. 3, and Fig. 7 is a horizontal sectional view, taken on line —7—7—, Fig. 1.

It is well known that a demand exists for a simple and practical regulator for automatically controlling the action of generators and particularly generators connected to steam or hot water heating systems. With this end in view there have been devised various kinds of regulators adapted to be brought into action by steam and highly volatile liquids, but I am not aware that a practical regulator has been constructed, which is brought into action by the expansion and contraction of water, and is capable of positive and automatic regulation of the generator at any temperature.

My present invention has for its object the production of such a regulator and differs materially from those heretofore devised, in that, I use two pressure regulators of different sizes connected together and to a water containing or expansion chamber, by water containing passages and so constructed and arranged that, after the diaphragm of one regulator has been expanded to its utmost limit by the expansion of water, the other receives the additional expansion and acts as a safety or surplus device for preventing injury to the parts.

I have herein shown, and will immediately describe and claim a construction of my invention in which one pressure regulator is mounted above the other, and, in my application of even date herewith, I have described and claimed a construction of my invention in which the pressure regulators are arranged side by side.

—A— represents a generator of heat, which may be of any desired form, size, and construction. I have here shown a hot water generator connected by upflow and downflow pipes —a— and —a'— to a radiator —B—, or any suitable device for giving off the heat, and which may also be of desirable form, size, and construction.

—b— is a chamber (I will call it the "expansion chamber") preferably formed integral with the shell of the radiator —B—, and, as best seen at Fig. 7, its outer portion —b'— projecting beyond the corresponding wall —B'— of the radiator and its inner portion —b²— within the circulating chamber —B²— of the radiator. The chamber —b— is filled with a suitable fluid, as water, and consequently the inner side of the same is exposed to the action of the passing circulating fluid in the radiator —B—, and the temperature of the fluid within the chamber —b— is either raised or lowered accordingly as the temperature of the water within the radiator is raised or lowered; whereas its other side b' is exposed to the air within the room where the radiator is situated, and the temperature of the fluid therein is therefore to a certain extent also governed by the temperature of the air in such room. It will be noted, however, that although the wall of the chamber —b— is preferably formed integral with the radiator —B—, the interior of said chamber is unconnected with that of the radiator and there is no circulation between the chamber —b— and the radiator —B—.

—D— is the upper or safety pressure regulator connected by a pipe —d— to the upper part of the projecting portion —b'— of the chamber —b— the advantage of connecting this pipe —d— to the upper part of the expansion chamber being that, since said chamber contains water which is liable to have considerable dirt and sediment in it, it will be obvious that if the water is led to the regulators from the upper end of this chamber, but little dirt will be carried to said regulators and the diaphragms of the latter will not be so injuriously affected. This regulator also consists of a shell —D'—, a plunger —D²—, and a rocking lever —D³—, all of which parts may also be of desirable form and construction. The shell —D'— is composed of the upper and lower sections —d' —d²—, and interposed between them is a flexible expansible diaphragm —d³—. The lower end of the plunger —D²—, as best seen at Fig. 5, is reduced and threaded to form the spindle —d⁵— projecting through the diaphragm, and on this spindle are screwed nuts —d⁴— and —d⁶— respectively above and below the diaphragm —d³— next to which their faces are rounded as shown, the uppermost nut —d⁴— being screwed up against the shoulder, which is formed by the lower end of the plunger D²; and the upper end of said plunger is hinged at —d⁷— to the rocking lever —D³— between the ends of the latter. The short arm of the rocking lever is formed with a depending arm —d⁸—, and is supported upon a link —d⁹— pivoted to an eye on the upper section —d'— of the shell —D'—. This lever is provided with a weight —D⁴—, and along the lower edge of the lever are the graduations of a scale —D⁵—. As seen at Fig. 6, the weight —D⁴— is provided with depending arms —d¹⁰— arranged on opposite sides of the rocking lever —D³—, and it is further provided with an opening —d¹¹— through which passes a pin —d¹²— adapted also to enter notches —d¹³— in the upper edge of the rocking lever.

—E— is the second (or governing) pressure regulator arranged beneath the plane of the former pressure regulator —D—, and connected thereto and to the chamber —b— by a pipe —F—. This second pressure regulator is preferably of similar construction to the former one —D—, and is composed of a hollow shell —E'— having upper and lower sections —e'—e²— and a diaphragm —e³—; a plunger —E²— provided with a nut —e⁴—; a rocking lever —E³— a pendent weight —E⁴—; and a link —e⁹—, corresponding to the larger than the similar parts —D'—, —d'—, —d²—, —d³—, —D²—, —d⁴—, —D³—, —E⁴—, and —d⁹— of the regulator —D—, except possibly the weight. The pipe —F— is formed with the lower outturned arm —f— connected to the section —e²— of the lower pressure regulator —E— and with the upper lateral arms —f'— and —f²—, the former being connected to the pipe —d— and the latter to a suitable water glass —G—.

At the upper end of the water glass —G— is a valve —g— and an inlet funnel —g'— for permitting the entrance of water or other fluid to my improved regulator should the glass —G— indicate a deficiency. The weight —D⁴— is of sufficient weight, and is so adjusted upon the rocking bar —D³— as to overbalance the weight —E⁴— connected to the outer end of the rocking bar —E³—. Consequently as the circulating fluid within the radiator —B— becomes heated and the water within the expansion chamber —b— commences to expand, the diaphragm —e³— of the governing pressure regulator is forced upwardly and the weighted end of the rocking lever —E³— is elevated.

—H— represents a suitable flexible connection (as a chain) between the free weighted end of the rocking lever —E³— and the lower free end of the draft door —A'— which latter is so hinged as to close automatically by its own weight, and —h—h—, suitable pulleys or other guides for supporting said connections. As the lever —E³— is elevated, the door —A'— is depressed and the draft shut off, thus partially shutting off the operation of the generator. Should the action of the generator still be sufficient to increase the expansion of the water within the chamber —b— the free end of the lever —E³— is elevated to its position shown at Fig. 2, and the door —A'— is almost closed; and, should the expansion in the chamber —b— still continue the door —A'— is entirely closed and the diaphragm —e³— reaches its utmost limit of expansion, but, owing to the presence of the upper or safety pressure regulator, the parts of my invention are not strained in the least, as the safety pressure regulator receives the additional expansion and the free or weighted end of the lever —D³— is elevated as shown at Fig. 3.

As has been stated above, the governing chamber E is larger than the safety chamber D, and hence presents a larger area of its diaphragm to the action of the expanding fluid beneath it than is presented by the diaphragm of the safety chamber. The result is that—even if the weights on the two arms were the same—the arm —E³— would be moved first and the damper of the generator adjusted, after which the safety chamber comes into use to prevent the bursting of the regulators or pipes under undue pressure. If the areas of the two diaphragms were the same, it will be at once obvious that the weights, would have to be adjusted with extreme nicety to produce the desired operation of the device. Hence I consider it highly important that the two regulator chambers shall have different areas as shown in the drawings. If they had the same areas, it is highly possible that the weights would frequently become accidentally misplaced if constructed as seen in Fig. 4, or one or more of the weight-sections E⁴ might be accidentally knocked off. Obviously, the slighest change in the weight of either pressure regulator would vitally affect the successful operation of the whole device, and therefore when the diaphragms are of different areas the exact adjustments of the weights become matters of somewhat less importance. Of course, the action of a pressure regulator might be controlled entirely by the adjustment of a weight provided such adjustment could be effected with suitable nicety, at proper times, by skilled persons, and under favorable conditions; but with devices of this character—parts of which are in the dusty cellar exposed to cobwebs, accumulated coal dust, the strong force of drafts, and other exterior influences; and other parts of which may be located at convenient points for interference by unskilled persons or children, or where they can be accidentally struck during daily movements around the room—I consider it highly important that the diaphragms in the two regulators shall be of different areas. It will be evident, however, that the combined area of the two hollow shells —E'— and —D'— must be sufficient to receive the utmost possible expansion of the water within the shell —b—.

The safety pressure regulator is preferably arranged in the kitchen or in any other room of the house so as to be within convenient access of one of the servants, and by simply adjusting the weight —D⁴— he may regulate at will the action of the generator and lower or increase the temperature of the water within the radiator.

As previously stated the plunger —D²— is formed with a lower nut —d⁵— beneath the diaphragm —d³— and by moving the weight —D⁴— upon the short arm of the lever —D³—, the free end of the lever is elevated, and draws the diaphragm —d³— upwardly, and the door —A'— is suddenly opened. This is an essential feature of my invention as it is frequently necessary in cases of emergency to vary the operation of the heater, and, as stated, this may be effected from the kitchen or other suitable room containing the safety pressure regulator.

The operation of my invention will be readily perceived from the foregoing description and upon reference to the drawings, and it will be noted that the same is simple, effective, and practical. I do not however, restrict myself herein to any particular form of generator, radiator —B—, or particular form of pressure regulator as the same may be varied at will. I prefer, however, to subject the expansion chamber of my regulator to the variations in temperature of the water in the radiator, as the operator may easily regulate the operation of the heater by means of a safety regulator within the room it is desired to heat, and thus maintain the required degree of heat with almost absolute certainty. Moreover, as the water loses a certain amount of its heat in traveling from the generator to the radiator, by operating my regulator by the variations in temperature of the water in the radiator, I can maintain a higher degree of heat than if the same were subjected to the variations in temperature of the water in the generator, since although there may be steam in the generator, the loss of temperature of the water in passing from the generator to the radiator obviates the presence of steam in the radiator and consequently, the action of the regulator is not impaired by the presence of the same even though the steam may be present in the generator.

I am aware that two pressure regulators of equal area have been connected by a pipe containing a column of mercury, but I do not herein claim such a construction.

Having thus fully described my invention, what I claim as new, and desire to secure by Letters Patent, is—

1. The combination with a hot water generator having a draft door; of a radiator for the circulating fluid, an expansion chamber adjacent said radiator, a pressure regulator provided with a water-containing chamber, a pipe between the latter chamber and the expansion chamber, a second pressure regulator provided with a water-containing chamber, a pipe between the former pipe and the water-containing chamber of the second pressure regulator, independent levers pivotally supported and operated by the two pressure regulators, a weight on the lever of the former pressure regulator adjustable to either side of its pivot, and a movable connection between the draft door and the lever which is operated by the latter pressure regulator, substantially as and for the purpose specified.

2. The combination with a safety pressure regulator comprising a chamber, a flexible diaphragm therein, a plunger having one end connected with said diaphragm and the other projecting outside said chamber, a lever hinged between its ends to the upper end of said plunger, a supporting link —$d^9$— pivoted to said lever also between the ends of the latter, a weight —$d^4$—, and means for securing it in position on said lever at either side of said supporting pivot; of an expansion chamber, a connection between this chamber and said pressure regulator, and a heat generator adjacent said expansion chamber, as and for the purpose set forth.

3. The combination with a heating apparatus which includes a heat generator and a radiator; of a heat regulator consisting of an expansion chamber in proximity to some part of the heating apparatus, a pipe leading from the expansion chamber, a diaphragm-chamber in communication with the said pipe, a pressure device connected with its diaphragm, a second diaphragm chamber, like the first, but having a larger diaphragm in connection with said pipe, and a heat controlling device connected with and controlled by the larger diaphragm, substantially as described.

4. The combination with a safety pressure regulator comprising a chamber, a flexible diaphragm therein, a plunger having one end connected with said diaphragm and the other projecting outside said chamber, a lever hinged between its ends to the upper end of said plunger, a supporting link —$d^9$— pivoted to said lever also between the ends of the latter, a weight —$d^4$—, and means for securing it in position on said lever at either side of said supporting pivot; of an expansion chamber, a connection between this chamber and said pressure regulator, a governing pressure regulator connected with said connection, a generator having a draft door, and connections between said governing regulator and the draft door, as and for the purpose set forth.

In testimony whereof I have hereunto signed my name, in the presence of two attesting witnesses, at Syracuse, in the county of Onondaga, in the State of New York, this 9th day of May, 1892.

ALFRED CATCHPOLE.

Witnesses:
CLARK H. NORTON,
L. M. BAXTER.